(12) United States Patent
Dunn

(10) Patent No.: US 8,089,440 B2
(45) Date of Patent: Jan. 3, 2012

(54) LIQUID CRYSTAL FLAT PANEL DISPLAY WITH AN INTEGRAL HEATER OF PREDETERMINABLE CAPACITY

(75) Inventor: William Dunn, Alpharetta, GA (US)

(73) Assignee: American Panel Corporation, Alpharetta, GA (US)

( * ) Notice: Subject to any disclaimer, the term of this patent is extended or adjusted under 35 U.S.C. 154(b) by 669 days.

(21) Appl. No.: 12/254,974

(22) Filed: Oct. 21, 2008

(65) Prior Publication Data

US 2009/0251397 A1    Oct. 8, 2009

Related U.S. Application Data

(60) Provisional application No. 61/041,752, filed on Apr. 2, 2008.

(51) Int. Cl.
*G02F 1/133*    (2006.01)

(52) U.S. Cl. ............................ 345/87; 349/21; 349/20
(58) Field of Classification Search .................. 345/87; 349/21, 20, 43, 72, 199
See application file for complete search history.

(56) References Cited

U.S. PATENT DOCUMENTS 7,324,176 B2 *   1/2008   Dunn et al. ................ 349/111
* cited by examiner

*Primary Examiner* — Amare Mengistu
*Assistant Examiner* — Joseph G Rodriguez
(74) *Attorney, Agent, or Firm* — Standley Law Group LLP

(57) ABSTRACT

A flat panel liquid crystal display has a front plate and a rear plate with a layer of liquid crystal material maintained in a cavity between them. A thin film transistor array layer is disposed in the cavity, as is an integral heater with a grid of intersecting sets of horizontal and vertical conductors. The heating capacity of the heater is predeterminably set by selectively interrupting continuity of at least some of the intersecting conductors. In some embodiments, the discontinuities occur in only one set of the intersecting conductors.

20 Claims, 3 Drawing Sheets

LIQUID CRYSTAL FLAT PANEL DISPLAY WITH AN INTEGRAL HEATER OF PREDETERMINABLE CAPACITY

CROSS-REFERENCE TO RELATED APPLICATIONS

This application is a non-provisional patent application and claims priority to co-pending application No. 61/041,752 filed Apr. 2, 2008, which is hereby incorporated by reference as if recited herein in its entirety.

TECHNICAL FIELD

Exemplary embodiments relate to the field of display devices and, more specifically, to the field of flat panel display devices that use liquid crystal display (LCD) technology. Exemplary embodiments relate to a flat panel LCD that incorporates an integral heater layer having a grid of intersecting conductors, wherein the continuous conductive path defined by the conductors has been selectively disrupted. By altering the amount of disruption, the heat output may be predetermined for the specific display.

BACKGROUND OF THE ART

Flat panel displays using liquid crystal display (LCD) technology are widely known and have found application in a number of fields for displaying visual information. In many situations, flat panel LCDs have displaced cathode-ray tube (CRT) displays, due to decreased weight and size. In other applications, flat panel LCDs have been able to penetrate markets where CRT displays were never considered practicable. One such area is the vehicle instrument panel market, where the flat panel LCD provides excellent visual representation of information.

One particular field of use is electronic flight indicators. These flight indicators are used to inform the pilot and, if applicable, the copilot, of various information for flying the aircraft. Common electronic flight indicators are the horizontal situation indicator (HSI), the attitude direction indicator (ADI), the altimeter and the air speed indicator. The data these instruments present can be analog, digital or a combination of analog and digital. Vehicles, especially aircraft, can be exposed to extremes in temperature, but the instrumentation must be reliable and able to respond in a timely fashion.

A known concern with LCD technology has been its slow response in low temperature situations, especially those that may be encountered when the vehicle sits overnight in a cold environment. Slow instrument response is simply not an available option in a vehicle. Heaters have been placed within LCD panels but there is a need for an improved heater design for LCD panels.

Although this need has been initially described with reference to electronic flight indicator applications of flat panel LCDs, the need for a predeterminably selected heater element for a flat panel LCD extends to a variety of other applications, such as lap-top computer screens and flat panel LCDs that are exposed to low temperatures, such as in self-serve gasoline pump installations and in cold storage facilities. Exemplary embodiments may be applicable to these and other applications.

SUMMARY OF THE INVENTION

This previously unmet need is met by a flat panel liquid crystal display comprising front and rear plates, with a layer of liquid crystals maintained in a cavity therebetween. A thin film transistor array layer disposed in the cavity establishes a grid of pixels to provide a visual image. A heater having a grid of intersecting conductors comprising a set of horizontal conductors and a set of vertical conductors is also interposed between the first and second plates to heat the liquid crystal material. The heater has a heating capacity that is predeterminably set by selectively interrupting continuity of at least some of the intersecting conductors, without causing Mura effects in the pixels.

BRIEF DESCRIPTION OF THE DRAWINGS

A better understanding of the exemplary embodiments of the invention will be had when reference is made to the accompanying drawings, wherein identical parts are identified with identical reference numerals, and wherein.

DETAILED DESCRIPTION OF A PREFERRED EMBODIMENT

Figure 1:
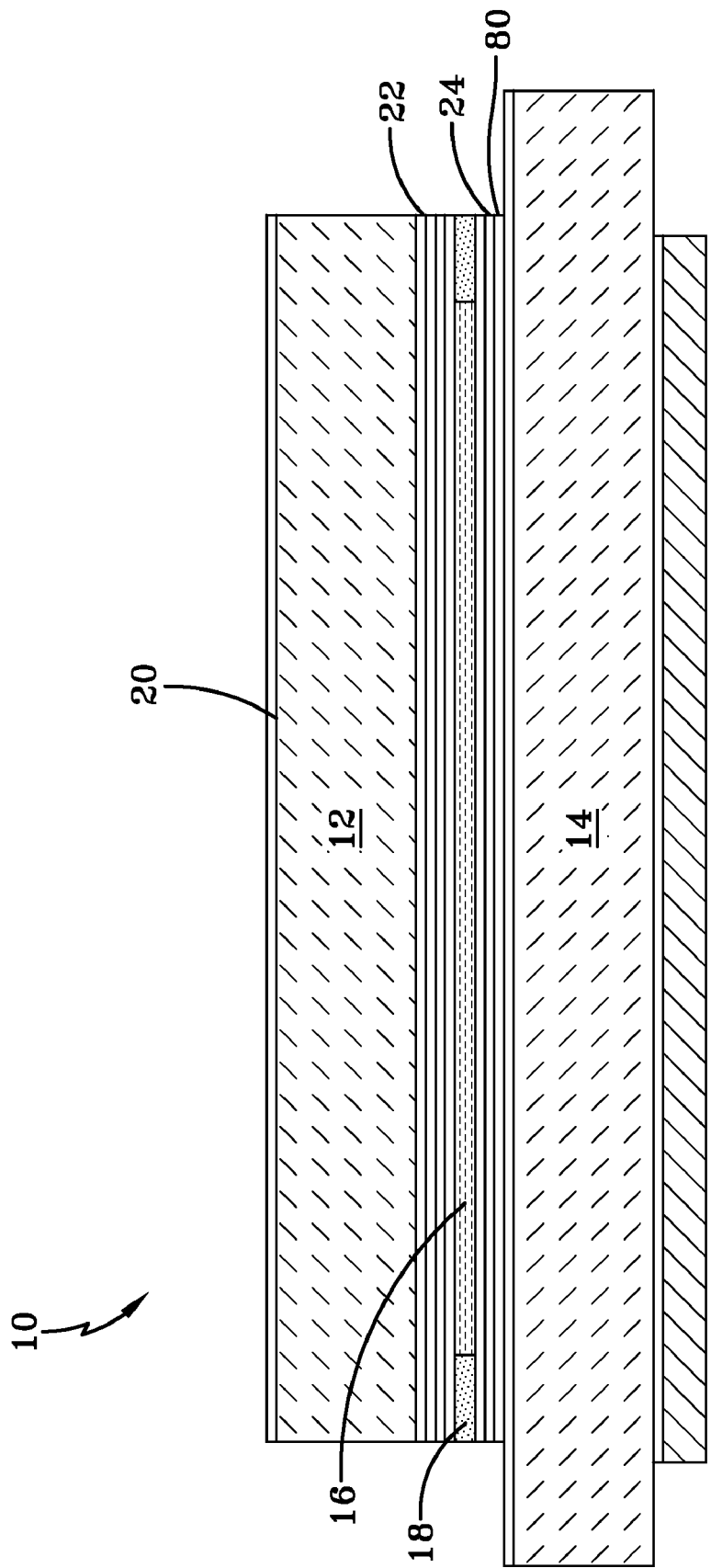
FIG. 1 illustrates an exemplary embodiment of the flat panel display.

Much of the detail for constructing a flat panel liquid crystal display (LCD) 10, as shown in side sectional view in FIG. 1, is known in the art and is unaffected by the exemplary embodiments, so that detail is not repeated here. A fuller description of the construction of the liquid crystal display may be found in the present inventor's co-pending application Ser. No. 10/679,977. Additionally, the heater layers described in this application may consist of many different materials and may be employed in or incorporated into systems such as those described in U.S. Pat. No. 7,265,809, U.S. Pat. No. 7,292,291, U.S. Pat. No. 7,324,176 and pending application Ser. No. 10/679,977, Ser. No. 11/849,065 and Ser. No. 11/057,888 which are all hereby incorporated by reference as if recited respectively in their entirety.

For purposes of this application, the relevant details of the exemplary embodiments are located between the front and rear plates 12, 14 of the liquid crystal display 10, so the present disclosure may be limited thereto while still enabling one of skill in this art. Both front plate 12 and rear plate 14 are visually transparent. Both are typically constructed of glass and provide the conventional rigidity. In the applicable art, front plate 12 is generally referred to as the "color filter" (CF) plate, and rear plate 14 is generally referred to as the "thin film transistor" (TFT) plate. According to known principles of the relevant art, a layer of liquid crystal material is contained in a thin cavity 16 maintained between the plates 12, 14 by a sealing adhesive 18 that extends around a periphery of the plates.

By known principles, electrical interaction of the respective plates 12, 14 with the liquid crystal material causes localized alignment of the liquid crystal material in cavity 16. This alignment affects the transmissibility of light through the plates 12, 14 at that localized point. A display area visible through an external face 20 of the front plate 12 is effectively divided into a large plurality of pixels, typically into a rectangular grid of such pixels. In one known arrangement, the pixels are arranged into horizontally-aligned color dot triplets of red, green and blue sub-pixels. The close proximity of the color dot triplets allows them to co-act to provide a visual perception of a single pixel in one of literally thousands of color variations that can be achieved through combinations of intensity of the aforementioned three colors. These intensity variations are achieved through the selective alignment and non-alignment of the liquid crystal material immediately adjacent to the subpixels. Specifically, transistors in the TFT plate, when activated, act upon the liquid crystal material to change the polarization plane of the liquid crystal material. The interaction of the liquid crystal material with front and rear polarizers (outside of the front and rear plate and not shown in FIG. 1) alters the emission intensity of the three primary colors transmitted through each set of color dots transistors comprising each pixel. Because the pixels are arranged in an X-Y type matrix, this row and column geometry has row address lines that are driven from at least one of the two side edges and column address lines that are driven from at least one of the top and bottom edges, by known driver technology.

The row and column address line driver chips are typically mounted on separate printed circuit boards that are disposed adjacent to the panel edges. These circuit boards interface the driver chips with a central controller for controlling output of the LCD. Known technology is to use a flexible circuit assembly for the driver chips.

The liquid crystal material in cavity 16 is viscous by nature. Its ability to react to changing electrical conditions is strongly influenced by temperature, with increased viscosity slowing reaction time. In the known art, it has been known to use resistive heating elements outside of the front and rear plates 12, 14 to influence the temperature of the liquid crystal material, but the preferred materials for the front and rear plates are typically poor thermal conductors. It is also known to place an electrical heating element or elements in the rear plate 14. Such a heating element must be electrically insulated, so as not to electrically interfere with the interaction of the plates that provides the desired liquid crystal display. In summary, these known art attempts have not provided the desired solution to the problem.

It is also known in the known art to use the electrical resistance of a thin film of an optically-transparent, electrically-conductive film, such as indium tin oxide (ITO) on a glass plate that is a part of the LCD assembly, but not the front or rear plate 12, 14, to generate heat for the liquid crystal material. These efforts have not been entirely satisfactory in providing an LCD that is sufficiently reactive after exposure to cold temperatures.

In designing a direct current heater for the cavity 16 of a flat panel LCD 10, inherent limitations must be addressed. A grid of heater conductors is easily laid out in theory; implementing the grid is not as easy. Each heater conductor passes through the LCD, either directly or indirectly between a so-called "heater+" and a "heater−" connection. The total electrical resistance in the heater conductor depends upon the length, cross-sectional area and composition of the heater conductor. It is quickly recognized that these "variables" are not readily able to be varied. The length of a heater conductor is effectively fixed by the active display area, or more particularly, the length and/or width of the display area, as these determine the distance between the heater+ and heater− connections. Further, there are process limits or rules that fix limits of cross-sectional area of the heater conductors. It is desired to dissipate between 1 to 2.2 watts per square inch of display area. The voltage available for powering the heater is limited by the dielectric strength limitations of the internal heater. In the particular situation, the maximum voltage is 28 Vdc. Additionally, composition of the heater conductors is strongly influenced by economic factors.

Operating within these limitations, it was difficult to provide the desired amount of control over power dissipation in the heater conductors. When attempts to reduce the cross-sectional area of the heater conductors failed to sufficiently increase heater resistance, the present solution was noted. By selectively breaking or disrupting the conductors in a repetitive pattern, a wide range of control over the total heater resistance is obtained.

If the flat panel LCD 10 were simply two plates 12, 14 maintained in slight separation to contain a simple liquid with a heater grid between the plates, selective disruption of heater conductor continuity would be elementary. However, the nature of the liquid crystal material complicates the issue. "Mura defects" are defined as areas of illumination anomaly from the surrounding area. They are also referred to as Brightness Non-Uniformities (BNUs). Pixels that make up a Mura defect have an anomalous pixel value, when compared to the surrounding area. To prevent Mura defects, each and every color dot or sub-pixel must see exactly the same local electrostatic field. Casual disruption of the heater grid continuity will also disrupt the uniformity of the electrostatic field, which may result in Mura defects.

As a result, exemplary embodiments may involve providing control of power dissipation in the heater grid while staying comfortably within the maximum and minimum conductor width and thickness process limits, and eliminating Mura defects. This may be accomplished by surrounding each color dot with sufficient portions of the metal grid heater to generate the proper electrostatic field to prevent Mura defects, while breaking the appropriate conductors to prevent current flow and thereby increase the heater resistance.

Figure 2:
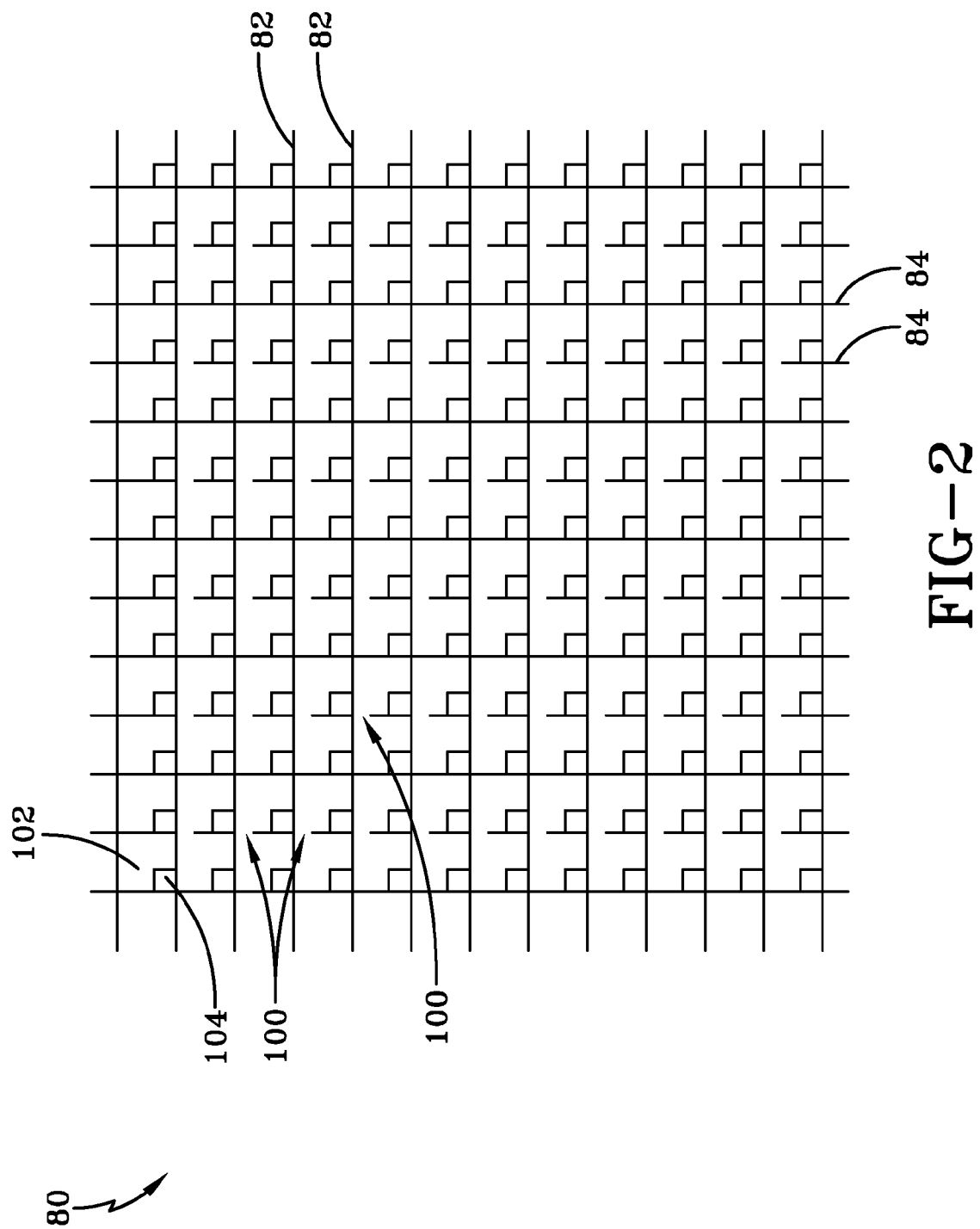
FIG. 2 illustrates a plan view of an integral heater design having selectively broken conductors.

An integral heater 80 of the exemplary embodiments is shown in plan view in FIG. 2, as it would be viewed from the external face of the LCD. As seen in FIG. 1, the integral heater 80 is intended to be positioned behind a black mask 22, which will be known and typically positioned near a rear surface of the color plate 12. Preferably, the integral heater is closely associated with the thin film transistor array 24, as also seen in FIG. 1. Accordingly, there is essentially no reduction in LCD optical transmission and image luminance, no increase in ambient light reflections, no degradation in image contrast, and no issues with heater electrical termination. Electrical termination is preferably accomplished automatically with known TCP and anisotropic conductive film (ACF) termination. The TCP connection between the LCD and display electronics is advantageous as it provides a flexible connection.

In the illustrated embodiment of FIG. 2, the integral heater 80 comprises a grid of intersecting horizontal and vertical controlled-resistance heater conductors or lines 82, 84. In this embodiment, the heater conductors 82, 84 preferably lie directly aligned with source and gate bus lines. The conductors 82, 84 will generally be narrower than the corresponding bus lines. The conductors 82, 84 will generally not intrude into the sub-pixel apertures 102 that correspond to the color dots. All features of the integral heater 80, including the heater+ and heater− bars, may be covered by the black mask in the assembled LCD cell and are outside of the active pixel aperture 102. The conductors may be patterned atop of a passivation layer of the TFT array and then overcoated with an additional passivation layer to electrically isolate the heater 80 from the pixel capacitors. Both passivation layers provide sufficient dielectric strength to support an electrical potential of up to 200 Vdc on the heater grid. During heater operation, heater+ is preferably connected to less than or equal to 28 Vdc. When the heater is not operating, the heater+ connection is preferably connected to heater− and ground.

The continuous connection of the heater− to the electrical ground potential will not cause visible LCD image artifacts, including, but not limited to, image sticking. The repeated electrical connection of the heater+ to voltages of less than or equal to +28 Vdc, for durations of up to 5 minutes at a time, will also not cause visible LCD image artifacts, including, but not limited to image sticking.

If compliance with process rules results in a heater resistance that is too low in any of the integral heater 80, then heater resistance may be increased by selectively breaking or cutting a pattern of discontinuities 100 of one set of the heater conductors 82, 84, as shown in FIG. 2, in which the vertical conductors 84 are selected for cutting. In at least some embodiments of the invention, these vertical conductors 84 are the conductors that are directly connected to the heater+ and heater− connections. The selective discontinuities allow the resistance of the heater to be increased without creating Mura defects. The intact continuity of the second set of heater conductors, in this case the horizontal conductors 82, maintains the image quality. The selective discontinuity 100 in the vertical conductors disrupts the current flow, which increases the resistance in each color dot 102. Increased resistance generates heat and thus allows the integral heater 80 to increase its heat generating capacity. The discontinuity 100, however, is small enough to maintain the voltage potential around each color dot 102. As is known in the art, each color dot 102 includes a transistor 104. Each transistor may include a capacitor (not shown), as is also known in the art.

Figure 3:
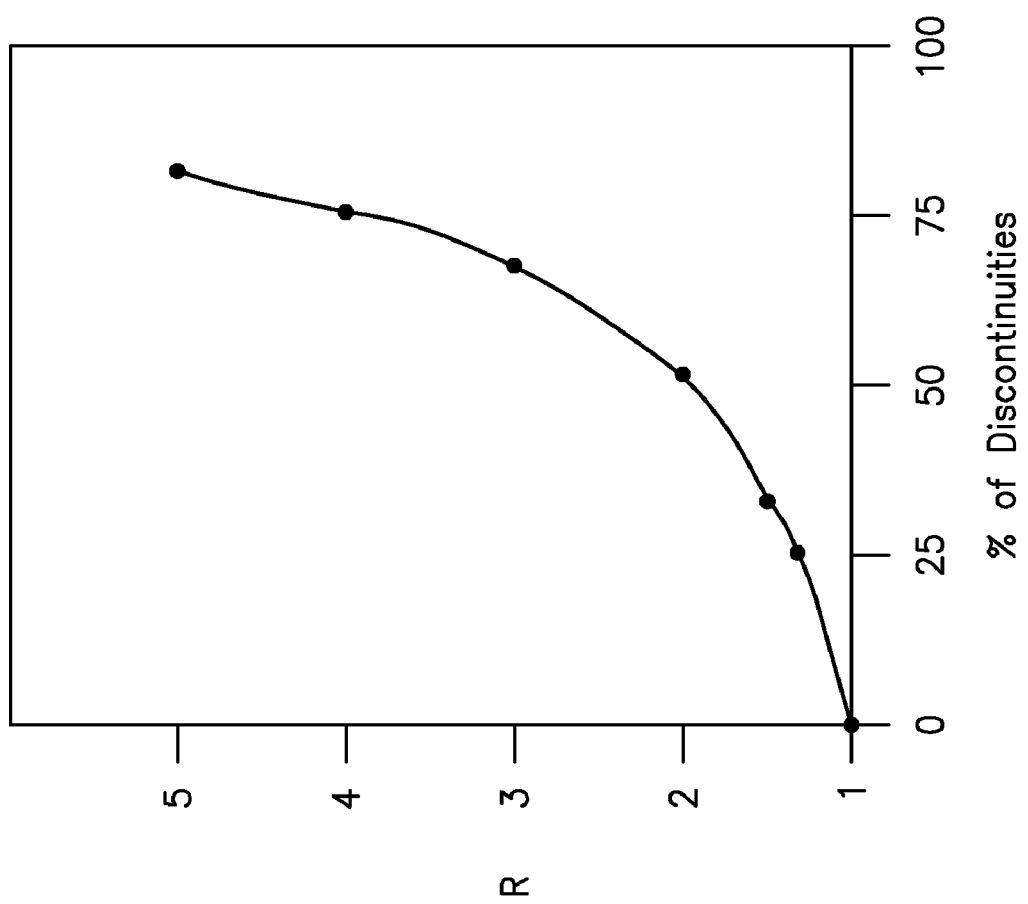
FIG. 3 is a graphic representation of the effect of selectively disrupting conductor continuity on the overall resistance (R).

For illustrative purposes, it will be seen from FIG. 3 that an effective increase in heater resistance, as measured by a ratio R of resultant resistance to initial resistance, can be achieved by selectively causing discontinuities in as few as one in every four conductors. Even with a five-fold increase in resistance, no Mura effects were observed.

In some embodiments of the invention, it may be desirable to provide more than one integral heater 80, particularly where each integral heater is electrically isolated from the others.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A flat panel liquid crystal display (LCD) comprising:
a front plate;
a rear plate;
a layer of liquid crystals maintained in a cavity between the front and rear plates;
a thin film transistor (TFT) array layer disposed in the cavity; and
a heater grid comprising a set of horizontal conductors and a set of vertical conductors in intersecting relationship, the heater grid interposed between the front and rear plates,
wherein the heater grid has a heating capacity that is predeterminably set by selectively interrupting continuity of at least some of the intersecting conductors.

2. The flat panel LCD of claim 1, wherein:
the heater grid is integral to the TFT array layer.

3. The flat panel LCD of claim 2, wherein:
the heater grid is patterned onto the TFT array layer.

4. The flat panel LCD of claim 1, further comprising:
a black mask layer interposed between said front and rear plates, with the heater grid optically hidden therebehind.

5. The flat panel LCD of claim 3, further comprising:
a black mask layer interposed between said front and rear plates, with the heater grid optically hidden therebehind.

6. The flat panel LCD of claim 1, wherein:
the TFT array layer comprises pixel capacitors, and
a passivation layer overcoats the horizontal and vertical conductors to isolate the heater grid electrically from the pixel capacitors.

7. The flat panel LCD of claim 3, wherein:
the TFT array layer comprises pixel capacitors, and
a passivation layer overcoats the horizontal and vertical conductors to isolate the heater grid electrically from the pixel capacitors.

8. The flat panel LCD of claim 1, wherein:
an insulating dielectric overcoats the heater grid.

9. The flat panel LCD of claim 3, wherein:
an insulating dielectric overcoats the heater grid.

10. The flat panel LCD of claim 1, wherein:
the heater grid is adapted to provide a greater heat output around a periphery of said display.

11. The flat panel LCD of claim 10, wherein:
the intersecting conductors have an areal density around the periphery that is higher than in a central portion of the display.

12. The flat panel LCD of claim 10, wherein:
the selective continuity interruptions have an areal density around the periphery that is higher than in a central portion of the display.

13. The flat panel LCD of claim 3, wherein:
the heater grid is adapted to provide a greater heat output around a periphery of said display.

14. The flat panel LCD of claim 13, wherein:
the intersecting conductors have an areal density around the periphery that is higher than in a central portion of the display.

15. The flat panel LCD of claim 13, wherein:
the selective continuity interruptions have an areal density around the periphery that is higher than in a central portion of the display.

16. The flat panel LCD of claim 1, wherein:
the heating capacity is predeterminably set by selectively interrupting continuity of only one of the two sets of intersecting conductors.

17. The flat panel LCD of claim 16, wherein:
the TFT array layer comprises first and second sets of perpendicularly arranged leads; and
the horizontal and vertical intersecting conductors are arranged to run parallel to the corresponding set of TFT array layer leads.

18. The flat panel LCD of claim 3, wherein:
the heating capacity is predeterminably set by selectively interrupting continuity of only one of the two sets of intersecting conductors.

19. The flat panel LCD of claim 18, wherein:
the TFT array layer comprises a first and a second set of perpendicularly arranged leads; and
the horizontal and vertical intersecting conductors are arranged to run parallel to the corresponding set of TFT array layer leads.

20. A flat panel liquid crystal display (LCD) comprising:
a front plate;
a rear plate;
a layer of liquid crystals maintained in a cavity between the front and rear plates;

a thin film transistor (TFT) array layer comprising a first and a second set of perpendicularly arranged leads disposed in the cavity; and a heater grid comprising a set of horizontal conductors and a set of vertical conductors in intersecting relationship, the heater interposed between the front and rear plates, the heater patterned onto the TFT array layer such that the horizontal and vertical conductors are arranged to run parallel to the corresponding set of TFT array layer leads;

wherein the heater grid has a heating capacity that is predeterminably set by selectively interrupting continuity of some of the intersecting conductors in only one of the two sets thereof.

* * * * *